United States Patent
Vittayarukskul

(10) Patent No.: US 12,243,315 B2
(45) Date of Patent: Mar. 4, 2025

(54) DIGNITY PRESERVING TRANSFORMATION OF VIDEOS FOR REMOTE MONITORING BASED ON VISUAL AND NON-VISUAL SENSOR DATA

(71) Applicant: Lily Vittayarukskul, San Francisco, CA (US)

(72) Inventor: Lily Vittayarukskul, San Francisco, CA (US)

( * ) Notice: Subject to any disclaimer, the term of this patent is extended or adjusted under 35 U.S.C. 154(b) by 0 days.

(21) Appl. No.: 18/416,836

(22) Filed: Jan. 18, 2024

(65) Prior Publication Data

US 2024/0203124 A1   Jun. 20, 2024

Related U.S. Application Data

(63) Continuation of application No. 17/559,510, filed on Dec. 22, 2021, now Pat. No. 11,922,696.

(51) Int. Cl.
| | |
|---|---|
| G06V 20/52 | (2022.01) |
| G01J 5/00 | (2022.01) |
| G01S 17/86 | (2020.01) |
| G06F 18/214 | (2023.01) |
| G06F 18/25 | (2023.01) |
| G06N 20/00 | (2019.01) |

(Continued)

(52) U.S. Cl.
CPC ............ *G06V 20/52* (2022.01); *G06F 18/214* (2023.01); *G06F 18/2148* (2023.01); *G06F 18/251* (2023.01); *G06N 20/00* (2019.01); *G06V 10/225* (2022.01); *G06V 10/74* (2022.01); *G06V 10/82* (2022.01); *G06V 20/46* (2022.01); *G06V 40/103* (2022.01); *H04N 7/183* (2013.01); *H04N 23/80* (2023.01); *G01J 5/0025* (2013.01); *G01S 17/86* (2020.01)

(58) Field of Classification Search
None
See application file for complete search history.

(56) References Cited

U.S. PATENT DOCUMENTS

| | | |
|---|---|---|
| 11,244,509 B2 | 2/2022 | Friesenhahn et al. |
| 2006/0001545 A1 | 1/2006 | Wolf |

(Continued)

OTHER PUBLICATIONS

United States Office Action, U.S. Appl. No. 17/559,510, filed May 25, 2023, 13 pages.

(Continued)

*Primary Examiner* — Xiaolan Xu
(74) *Attorney, Agent, or Firm* — Fenwick & West LLP

(57) ABSTRACT

A system monitors moveable objects using sensor data captured using one or more sensor mounted on a location of the moveable object. The system uses a machine learning based model to predict a risk score indicating a degree of risk associated with the moveable object. The system determines the action to be taken to mitigate the risk based on the risk score. The system transmits information describing the moveable object based on the sensor data to a remote monitoring system. The system may determine the amount of information transmitted, the rate at which information is transmitted, and the type of information displayed based on the risk score. The system performs dignity preserving transformations of the sensor data before transmitting or storing the data.

20 Claims, 9 Drawing Sheets

Related U.S. Application Data

(60) Provisional application No. 63/208,792, filed on Jun. 9, 2021.

(51) Int. Cl.
*G06V 10/22* (2022.01)
*G06V 10/74* (2022.01)
*G06V 10/82* (2022.01)
*G06V 20/40* (2022.01)
*G06V 40/10* (2022.01)
*H04N 7/18* (2006.01)
*H04N 23/80* (2023.01)

(56) References Cited

U.S. PATENT DOCUMENTS

| | | | |
|---|---|---|---|
| 2006/0104480 A1* | 5/2006 | Fleisher | G06V 40/103 |
| | | | 382/103 |
| 2016/0135706 A1 | 5/2016 | Sullivan et al. | |
| 2019/0069851 A1 | 3/2019 | Sharma et al. | |
| 2020/0272148 A1* | 8/2020 | Karasev | G01S 13/726 |
| 2021/0012254 A1 | 1/2021 | Campbell et al. | |
| 2022/0036058 A1 | 2/2022 | Sui et al. | |

OTHER PUBLICATIONS

United States Office Action, U.S. Appl. No. 17/558,410, filed Feb. 7, 2024, 15 pages.

\* cited by examiner

DIGNITY PRESERVING TRANSFORMATION OF VIDEOS FOR REMOTE MONITORING BASED ON VISUAL AND NON-VISUAL SENSOR DATA

CROSS REFERENCE TO RELATED APPLICATIONS

This application is a continuation of U.S. application Ser. No. 17/559,510, filed Dec. 22, 2021, which claims a benefit of U.S. Patent Application Ser. No. 63/208,792, filed on Jun. 9, 2021, the contents of which are incorporated by reference herein in their entirety.

FIELD OF INVENTION

This invention relates to machine learning in general and more specifically to machine learning based models for monitoring of a person using sensor data.

BACKGROUND

Sensors are used for monitoring mobile objects such as equipment or persons. Such sensors include cameras that obtain images or LiDAR sensors that can detect depth. Such equipment used for monitoring is often expensive and requires manual handling. For several situations, such expensive sensor equipment cannot be afforded. For example, use of expensive equipment may be prohibitive for monitoring risk scores associated with a person. Furthermore, such equipment may transfer data to a remote location monitored by agents. Transferring sensor data such as video frames requires large bandwidth for transmission and can be expensive and computationally inefficient. Also, storing such data can require large amount of storage since continuous monitoring can generate large amount of data over time. Continuous monitoring using human operators can be expensive as well as ineffective since humans are more prone to errors. Conventional techniques for monitoring moveable objects such as equipment or persons can be computationally inefficient and expensive.

SUMMARY

Embodiments perform dignity preserving transformations of videos of a person being monitored. A system receives sensor data captured by a plurality of sensors placed in a location. The sensors capture sensor data comprising the person being monitored and environment surrounding the person. The sensors include at least a camera and another sensor, for example, an infrared sensor or LIDAR. The system provides input based on images captured by the camera to a machine learning model. The machine learning model is trained to receive an input image of a person and predict a score representing a likelihood of requiring dignity preserving transformation of the input image. The system executes the machine learning model to determine a score value for images extracted from a video of the person being monitored. If the determined score indicates that dignity preserving transformations are required, the system performs dignity preserving transformation of the video. The dignity preserving transformation replaces at least a portion of the video captured by the camera with sensor data of the other sensor. The system transmits the transformed video to a remote monitoring system. The remote monitoring system displays the transformed video via a user interface.

Embodiments perform remote monitoring of a moveable object, for example, a person or a moveable equipment. The system receives sensor data captured by one or more sensors mounted on a device placed in a location of the moveable object. The sensor data captures sensor data representing the moveable object being monitored within the location. The sensor data may also capture the environment surrounding the moveable object. The system provides input based on the sensor data to a machine learning model. The machine learning model may be a neural network or a regression based model. The machine learning model is trained to receive a representation of input sensor data representing a particular moveable object and environment surrounding the particular moveable object and predict a risk score for the particular moveable object. The risk score represents a likelihood of the moveable object reaching a state determined to be high risk for the particular moveable object. The system executes the machine learning based model to predict a risk score value for the moveable object being monitored. The system determines information for transmitting to a remote monitoring system based on the risk score value predicted by the machine learning based model and transmits the information to the remote monitoring system. The remote monitoring system displays at least a portion of the determined information via a user interface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The techniques disclosed herein can be used for monitoring any moveable objects. One application of the techniques is monitoring a person, for example, a patient or a senior in a long term care facility. For example, the system disclosed may be used to determine whether a person being monitored is likely to fall or get injured. Conventional solutions to monitoring such persons include (1) using an in-person sitter/patient monitor per patient, (2) bed or chair or floor alarm, and/or (3) real-time virtual monitoring systems. These are expensive solutions and are also not effective in various situations.

A system according to various embodiments performs autonomous and non-autonomous monitoring of moveable objects such as persons. The system uses inexpensive client side computing methods, for example, using a cellular device (e.g. iPhone), or mobile device with similar functionality (e.g. iPad). The system further implements privatization methods to record content while preserving a person's privacy and dignity. The system uses artificial intelligence techniques such as machine learning based models for improved accuracy of prediction, thereby improving resource utilization including computation resources, communication bandwidth, storage utilization, as well as improved utilization of human resources such as human operators.

Figure 1:
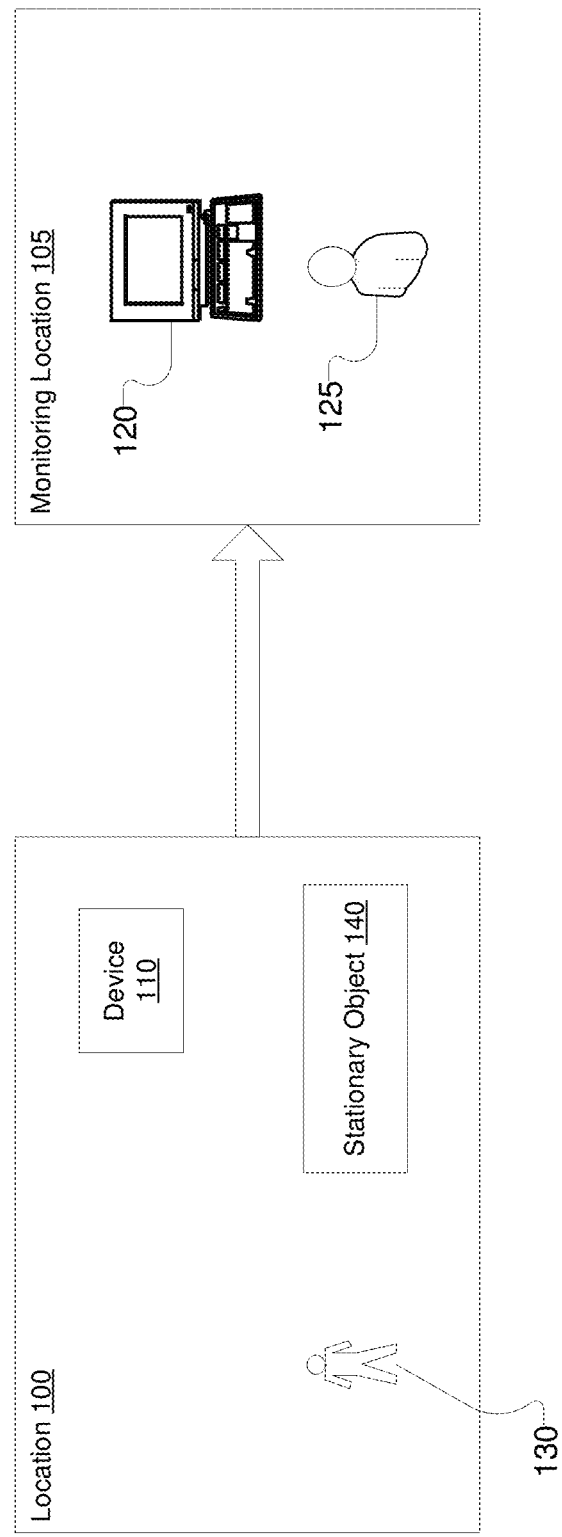
FIG. 1 is a diagram illustrating a system environment for remotely monitoring moveable objects, in accordance with an embodiment of the invention.

FIG. 1 is a diagram illustrating a system environment for remotely monitoring moveable objects, in accordance with an embodiment of the invention. The location 100 may represent a room, for example, a room in which a moveable object is location. The moveable object 130 maybe a person living in certain type of facility or at home. The moveable object 130 may be equipment in a manufacturing facility. Monitoring location 105 represents another room that includes equipment for monitoring moveable objects in location 100. Example of monitoring system 120 is a client device with a screen that allows the operator 125 to monitor the moveable objects of location 100. The location 100 includes an environment in which the moveable object performs actions. The environment may include stationary objects, for example, bed, cupboard, table, chair, and so on. The system uses feature describing the moveable object 130 as well as the stationary objects 140 to determine whether there is a risk to the moveable object. For example, the system may determine that a moveable object moving towards a stationary object at a fast pace may be at a high risk of colliding with the stationary object.

The device 110 includes sensors that capture data describing the moveable object 130. In an embodiment, the device 110 includes sensors such as camera, infrared sensors, LiDAR sensors, motion sensors, and so on. Examples of device 110 include a cellular device (e.g., iPhone), or mobile device such as an iPad but is not limited to these. The device 110 is able to monitor, detect, store, transmit, or perform other mechanisms or actions offline or purely on client-side, with some mechanism of communicating or transferring some information to a server or other device. The sensor data captured by the device 110 may be transmitted to the monitoring system 120 located in location 105. The monitoring system 120 executes client application(s) that provide information describing the moveable object 130 to the operator 125. The device 110 may read live video feed and use a local autonomous event detection model or algorithm. The device 110 may perform some function relative to some mechanism in which some information is transferred to a remote device, e.g., monitoring system 120 in location 105.

In an embodiment, the device 110 adapts the rate at which the machine learning model executes for predicting the risk score for the person being monitored based on the current prediction. Accordingly, if the current state of the person being monitored indicates low risk for the person, the system reduces the rate at which the device 110 executes the machine learning model. For example, if the person is performing a low risk action such as sleeping, the device executes the machine learning model at a low frequency, for example, once every 20 seconds. In contrast, if the person being monitored is determined to be performing an action that indicates higher risk, the system increases the rate at which the model is executed so that the model may be executed every few seconds. This conserves the energy of the device 110 and causes the device to run more efficiently. For example, if the device is a mobile phone, the battery of the device 110 lasts longer due to efficient utilization of power by the device.

In certain embodiments, the machine learning models used for predicting risk scores are highly computation intensive and the device 110 is not powerful enough to efficiently execute the machine learning models. In these embodiments, the device 110 transmits the sensor data to a server that is computationally more powerful and is configured to execute the machine learning models. The server may execute the machine learning model and send the result back to the device 110 as well as the monitoring system 120. The device 110 receives the result of prediction of the risk score and uses it to determine the rate at which the device 110 transmits the sensor data to the server running the machine learning model or the rate at which sensor data or any other information is transmitted to the monitoring system 120.

The machine learning models are trained using historical data that is labeled. The machine learning models are trained on a system different from the device 110, for example, on a separate server that stores the training data. The trained models are transmitted to various devices 110 that are on locations 100. The devices 110 collect sensor data and execute the trained machine learning models using the sensor data.

The device 110 is configured to detect a high-risk event with a high probability of occurrence based on analysis of sensor data. The data transferred by device 110 to monitoring system 120 may include video frames or some other information that describes a high-risk event. If the device 110 does not detect any high-risk event within the last X number of frames the device 110 shares information relevant to the state of the patient to the remote monitoring system 120 every Y frames periodically at a low data transfer rate.

In an embodiment, the system samples the sensor data for transmitting to the remote monitoring system. The system determines the sampling rate for sampling the sensor data based on the risk score value. Accordingly, the sampling rate is low for a low risk score value compared to the sampling rate for a high risk score value.

In one example, the person located in a room is a patient that is monitored remotely by an operator who is responsible for taking action in case the patient performs tasks that the patient is not supposed to perform. For example, a patient suffering from a particular condition may be asked not to perform certain kinds of movements. The operator (or agent) 125 may monitor the patient so that the operator may take action in response to the patient movements, for example, dispatch help for the patient or in certain situations, advise the patient at a later stage to avoid certain type of movements.

In an embodiment, the operator (or agent) 125 represents a human virtual monitor or autonomous virtual monitor or some other medium or agent that can perform some mechanism relevant to monitoring of the moveable object. For example, the agents may be hosted on a medium that renders some information such as the web client-side platform that renders (1) live video feeds of patients, (2) livestream replaced by text/image of current patient state if patient is in low-risk state, and/or (2) 'privatization mode'/'dignity-preserving mode' of patient live streams. In an embodiment, the agent 125 is a care team member, for example, a nurse of an emergency care team member monitoring a patient.

In one embodiment, the computer system 120 used by user 125 as a client device to is a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the computer system 120 can be a device having computer functionality, such as a personal digital assistant (PDA), mobile telephone, smartphone, etc.

In an embodiment, the device 110 communicates with the monitoring system 120 via a network (not shown in FIG. 1) that enables communications between the devices. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. Depending upon the embodiment, the network can also include links to other networks such as the Internet.

System Architecture

Figure 2:
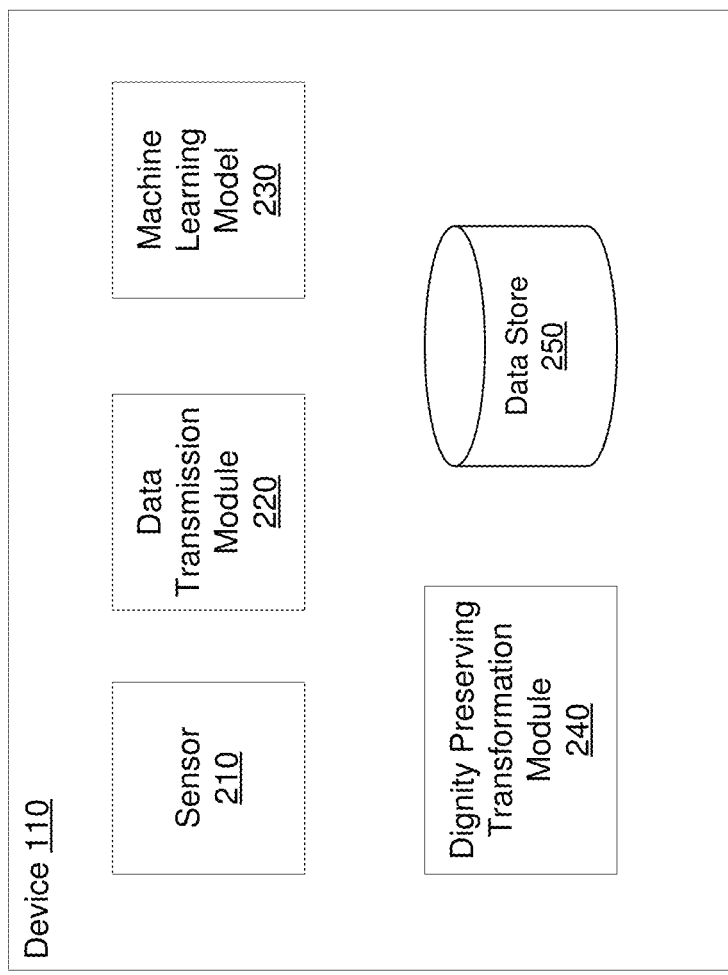
FIG. 2 is a diagram of system architecture of various modules running in device, in accordance with an embodiment of the invention.

FIG. 2 is a diagram of system architecture of various modules running in device 110, in accordance with an embodiment of the invention. The device 110 includes one or more sensors, a data transmission module 220, a machine learning model 230, a dignity preserving transformation module 240, and a data store 250. The device 110 includes implements effective and efficient methods to monitor, detect, store, transmit, or perform other mechanisms or actions using content while preserving user privacy and dignity. In other embodiments, the device 110 may include additional, fewer, or different modules for various applications. Conventional components such as network interfaces, security mechanisms, load balancers, failover servers, management and network operations consoles, and the like are not shown so as to not obscure the details of the system. Dignity preserving transformations may also be referred to herein as privatization transformations.

The device 110 uses one-to-many sensors and/or a single-to-hybrid of different sensors to implement methods to monitor, detect, store, transmit, or perform other mechanisms or actions content while preserving patient privacy and dignity. Dignity preserving transformations ensure that a person's visual images are not displayed when the person is in a particular state or performing certain actions. For example, a person may not want his/her images taken by a camera to be displayed when the person is in a nude state, i.e., without clothes. The person may not want his/her camera images to be displayed when the person is performing certain actions such as changing, bathing, taking shower, using toilet, and so on. A camera image shows a clear visual representation of a person. In contrast, non-visual sensor data such as IR sensor or LIDAR sensor does not show a clear visual image of a person. Accordingly, these are referred to as dignity preserving sensors since typically the subject person is unlikely to object to showing the sensor data captured by a dignity preserving sensor, even if they are in a compromising state or performing an action that requires dignity preservation. Dignity preserving transformations transform an input visual image that violates dignity of an individual to a representation that is dignity preserving. A simple dignity preserving transformation may completely replace the input image with a blank image that displays nothing. However, such transformations remove all information from the input image. Since a person is being monitored by a monitoring system, the goal of dignity preserving transformation is to retain as much information as possible about the input image, while transforming the image to a representation that is dignity preserving. Particularly the system aims to preserve information that is useful for determining any risk for the subject person, for example, health risk. Accordingly, a dignity preserving transformation retains as much information as possible for determining possible risks to the person while hiding visual representation of the image that violate dignity. The dignity preserving transformations may be applied before any image is displayed by the monitoring system to a monitoring agent. The dignity preserving transformations may be applied before any image is transmitted via a network, for example, to the monitoring system. The dignity preserving transformations may be applied before any image is stored in any storage system or even on the device 110.

For example, the device 110 uses a hybrid of RBG and IR and depth sensors to help disambiguate things in environment during a live feed so that dignity preservation is enabled during certain patient events, such as bathing, while ensuring accurate monitoring and detection. In terms of mechanism, sensor switch to privacy-inherent sensor (e.g., RBG to depth and/or IR sensor(s)) and/or using hybrid sensors to perform same function.

The dignity preserving transformation module 240 uses machine learning models to determine when dignity preserving transformations should be implemented and correspondingly transforms the video frames to preserve user dignity. The data store 250 stores data captured by sensors 210. The data transmission module 220 transmits data to remote devices, for example, monitoring system 120. The monitoring 120 is also referred to herein as a device that is monitored by a user 125. The user 125 is also referred to herein as a monitoring agent or an agent. In an embodiment, the agent is an automatic software system, for example, an expert system that either determines the action to be taken in a given situation or actually provides signals to instruments to take action, for example, sending an alert, sounding an alarm, and so on.

The sensors 210 include camera, infrared sensors, LiDAR sensors, motion sensors, and so on. The sensors capture data that is transformed by the dignity preserving transformation module 240. In an embodiment, any video frames captured by a sensor that display images of a person (e.g., patient) are transformed by the dignity preserving transformation module 240 before they are stored in the data store 250 or before they are transmitted to a remote device by the data transmission module 220.

Overall Process

Figure 3:
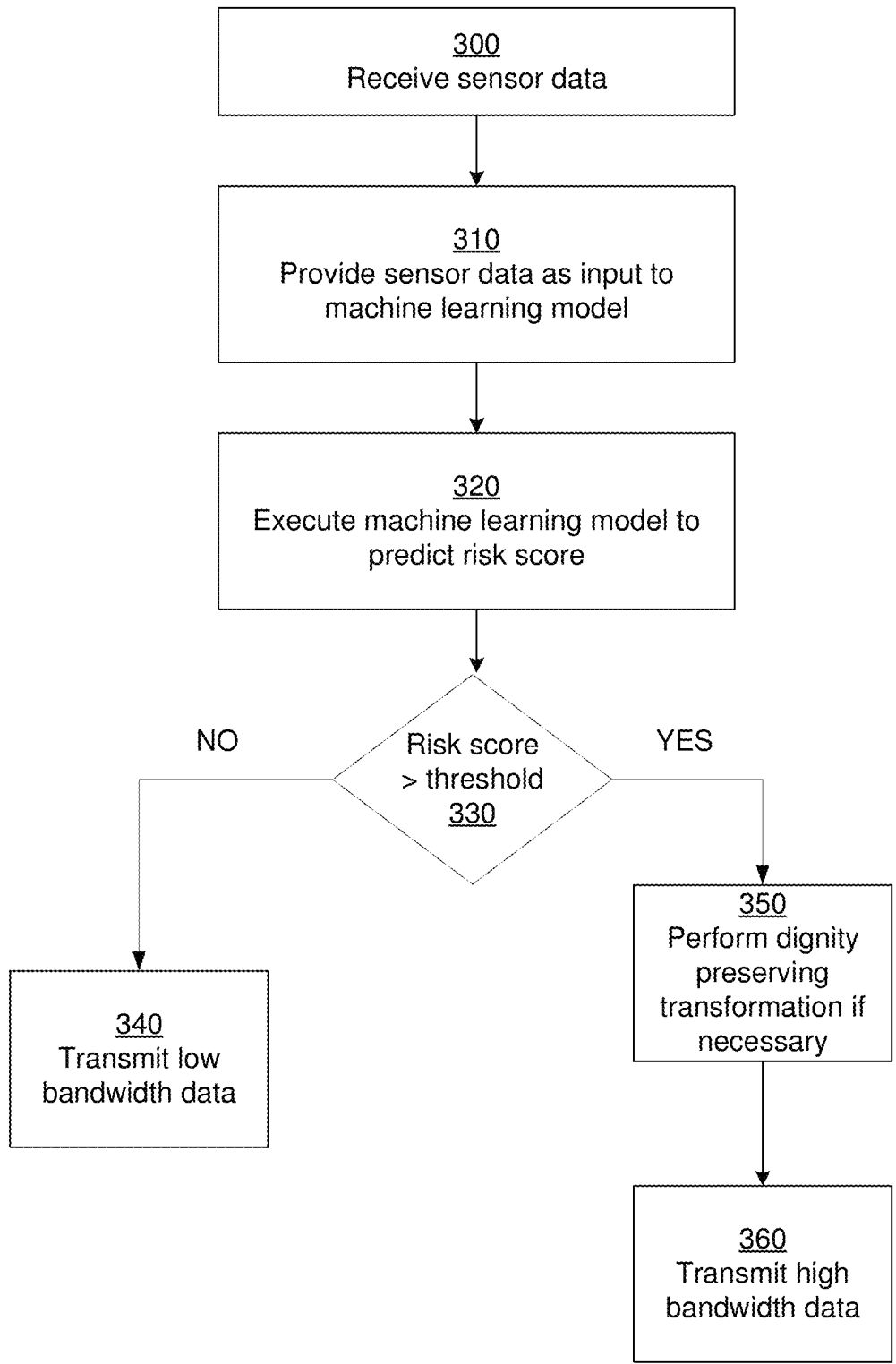
FIG. 3 is a flowchart of a process illustrating remote monitoring of a moveable object, in accordance with one embodiment of the invention.

FIG. 3 is a flowchart of a process illustrating remote monitoring of a moveable object, in accordance with one embodiment of the invention. The steps of the process may be performed in an order different from that indicated in FIG. 3. The steps may indicated as being performed by a system and may be performed by the various modules of the device 110 as shown in FIG. 2.

The device 110 receives 300 sensor data of the environment that may include a moveable object such as a person being monitored. The sensor data may include data captured from various sensors of the device 110, for example, one or more cameras of the device, LIDAR, infrared sensor, and so on.

The sensor data received is provided 310 as input to a machine learning model 230. In an embodiment, a feature vector comprising various features extracted from the sensor data are provided as input to the machine learning model 230. In an embodiment, the machine learning based model is a regression based model configured to receive a feature vector derived from the sensor data. In this embodiment, the system may execute separate models or processes to extract features of the sensor data, for example, features describing objects in the proximity of the moveable object, features describing a type of action being performed by the moveable object, and so on.

In another embodiment, the machine learning based model is a classifier that predicts a risk category for the moveable object, wherein the risk category can indicate a high risk, a low risk, or a medium risk. In another embodiment, the machine learning model 230 is a neural network that receives the sensor data and generates feature vector using the hidden layers of the neural network.

The machine learning model 230 is executed 320 to predict a risk score indicating a degree of risk to the moveable object being monitored. The risk represents an accident involving the moveable object. For example, if the moveable object is a person, the risk score indicates that the person has an accident, for example, by falling while walking. If the moveable object represents a machinery, the risk may indicate that the machinery collides with another object, for example, a person or a stationary object such as a shelf or wall.

The machine learning model receives as input various types of sensor data. The sensor data provided as input to the machine learning model may include camera data, infrared sensor data, LIDAR data, and so on. In some embodiments, the sensor data includes data generated by devices such as wearable devices such as watches (APPLE watch) that can sense biometric signals such as heart rate, breathing rate, and so on. The biometric signals if available may be provided to the machine learning model as input.

The system transmits information describing the moveable object to a remote system, for example, a monitoring system 120 in monitoring location 105. The information transmitted may be the sensor data or some information extracted from the sensor data. The system compares the risk score with a threshold value. The threshold value may be configurable. If the risk score is determined 330 to be below the threshold value, the system transmits 340 low bandwidth data. For example, if the system is monitoring a person, the system may transmit a message indicating that the person is not performing any risky task that can cause harm to the person. In an embodiment, the system uses a machine learning based model to predict the type of action that the person is performing, for example, sleeping, sitting, walking, getting up, falling down, tripping, and so on. The system transmits the type of action that the person is performing. The type of action being performed is a low bandwidth data since the number of possible types of actions is limited and can be represented using a small numeric value, for example, an enumeration of the types of tasks that a person can perform. In an embodiment, the low bandwidth data represents the sensor data that is sent using low bandwidth, for example, low resolution signal is transmitted or only a few frames from the sensor data sent periodically rather than all consecutive frames.

If the risk score is determined 330 to exceed the threshold value, the person is determined to be performing some action that can harm the person. In this situation, the system transmits 360 high bandwidth data, for example, the data of one or more sensors. The sensor data is transmitted to the remote monitoring location to allow an agent to inspect the situation so that the agent can take an action, for example, send help to the person or call the person to provide instructions, for example, to stop the person from performing the risky actions.

In an embodiment, the system performs 350 a dignity preserving transformation of the sensor data that is being transmitted. In some embodiments, the system performs the dignity preserving transformations of sensor data as it is stored. This way the raw sensor data is never stored. This provides guarantee to the person being monitored that their privacy and dignity is being honored by the monitoring equipment. In an embodiment, the raw sensor data is stored in a secure manner, for example, using encryption or protected using credentials such as password. This ensures that raw sensor data can only be accessed by restricted and privileged users, for example, medical personnel. However, data that has gone through dignity preserving transformations can be accessed by general users without special privileges. This allows agents with lower privileges to monitor the person, however raw sensor data can only be accessed by privileged users if necessary. For example, raw sensor data may be helpful to medical personnel to diagnose specific conditions or to determine how to help the person being monitored. This prevents loss of information from the sensor data.

The system preserves network bandwidth by transmitting sensor data only if the risk score is high and transmitting low bandwidth data when the risk score is low. Typically, the likelihood of risk score exceeding a threshold is low. As a result, the high bandwidth data that includes sensor data is transmitted only for a small amount of time. This allows the monitoring system to monitor a large number of locations. If all locations were transmitting high bandwidth data continuously, the monitoring system may not have sufficient bandwidth to receive data from all locations being monitored. The process shown in FIG. 3 allows a monitoring system to monitor a large number of locations since for majority of the time, the locations are transmitting low bandwidth data. Only some of the locations may need to transmit the high bandwidth data as a result of risk score exceeding the threshold and for a small amount of time.

Furthermore, the monitoring system is able to display information about a large number of users via a user interface. This is so because the low bandwidth data can be displayed compactly. For example, the low bandwidth data may simply indicate the type of action that a person is performing. Accordingly, the low bandwidth data may be displayed for several persons being monitoring by providing minimum information for example, identification of the person being monitored, location of the person being monitored, and a textual description of the action being performed by the person being monitored. Since a significant majority of persons being monitored are likely to be performing low risk actions, the information describing a large number of users can be displayed in the compact form. If a small fraction of persons being monitored reach a high-risk state, high bandwidth information of these persons is displayed. Accordingly, the display information of a person being monitored switches from the compact representation (low bandwidth representation) to a high bandwidth representation when the person performs a risky operation. Since the likelihood of the persons reaching high risk states is low, high bandwidth data (sensor data) of only a small fraction of persons being monitored is likely to be displayed at a time.

Figure 4:
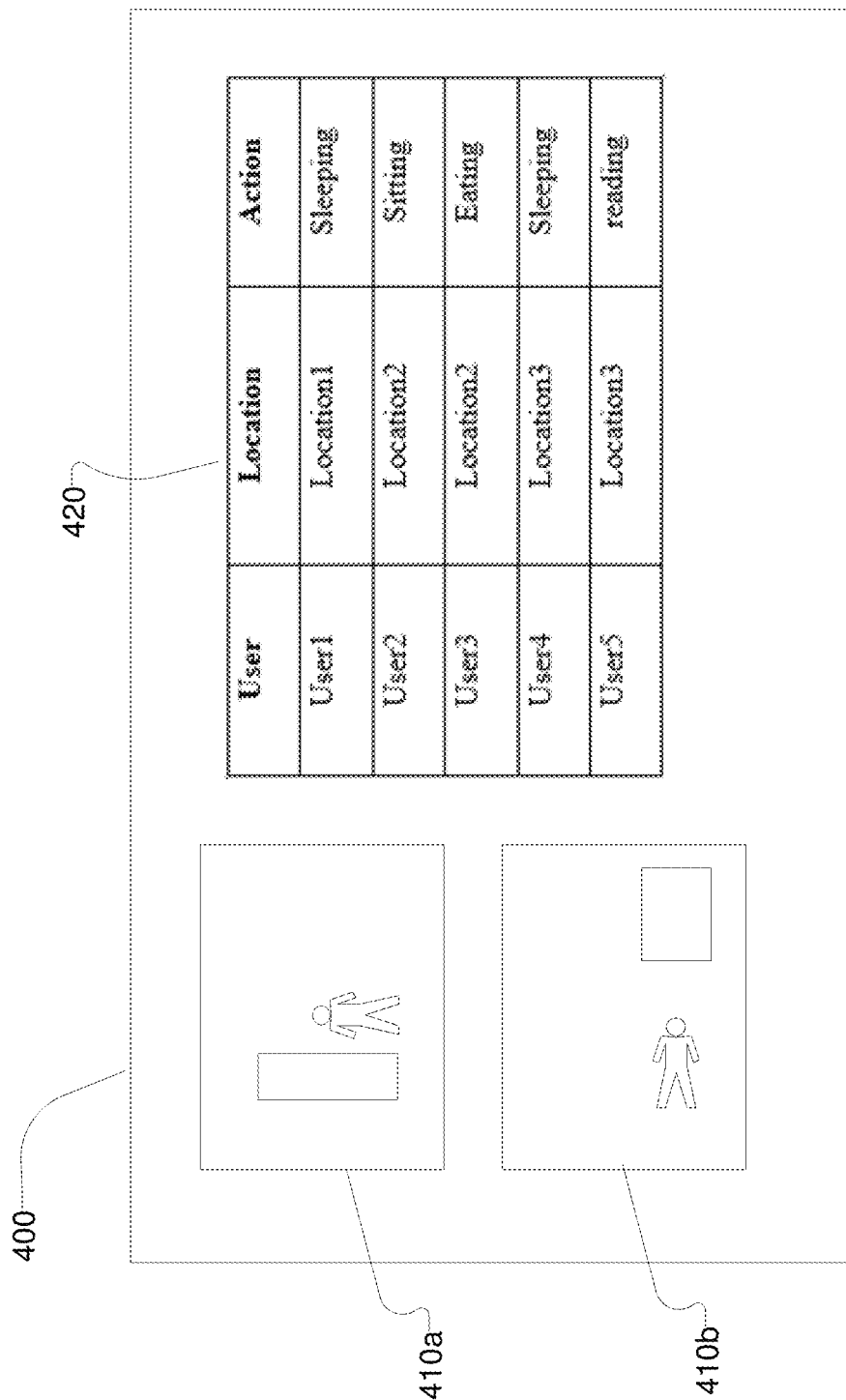
FIG. 4 shows an example user interface of a monitoring system, according to an embodiment.

FIG. 4 shows an example user interface of a monitoring system, according to an embodiment. The user interface 400 includes low bandwidth data 420 for a set of users. The user interface 400 also includes high bandwidth data, for example, sensor data 410a and 410b for a smaller set of users. The high bandwidth data 410 is displayed only for uses that are predicted to have a risk score above a threshold value. The low bandwidth data 420 is displayed for a majority of persons being monitored that have risk score below the threshold.

Dignity Preserving Transformations

Typical monitoring systems do not support privatization methods or effective mechanisms to preserve patient privacy and dignity. A system may stop video the feed once it is requested by patient or care staff or other relevant agent(s) of the environment.

The system according to various embodiments, performs dignity preserving transformation of the signals that are stored or transmitted. The system uses a hybrid of RBG, IR, and depth sensors for dignity preservation. The system identifies data generated by certain non-visual sensors as dignity preserving signals. A non-visual sensor is a sensor that generates data that is not intended for viewing by humans and is expected to be processed by a computer processor or machines. A non-visual sensor may also be referred to herein as a dignity preserving sensor or privacy preserving sensor.

The non-visual sensors may generate videos or images, however the videos or images do not include a clear visual representation of the subject person being shown in the video/image. For example, a LIDAR sensor data may show lines capturing depth information that may be used to identify the presence of a subject person in the image but does not include enough visual information to show visual details of the person. Similarly, infrared (IR) sensor may include enough details of a person to show the presence of a person in the video/image without showing visual details of the person that show the person clearly. As a result, the sensor data obtained from the non-visual sensors is dignity preserving since they do not include enough visual details to cause privacy concerns for the subject person shown in the video/image.

The system detects based on the action being performed by the person being monitored, whether dignity preserving transformation is required. If the system determines that dignity preserving transformation is required, the system performs the dignity preserving transformation. Accordingly, the system detects need for dignity preservation and switches between visual data and dignity preserving sensor data as needed.

Accordingly, a hybrid combination of RBG (camera) and IR (infrared sensor) and depth sensors is used to help disambiguate things in environment during a live feed so that dignity preservation is enabled during certain patient events, such as bathing, or changing, while ensuring accurate monitoring and detection.

Figure 5:
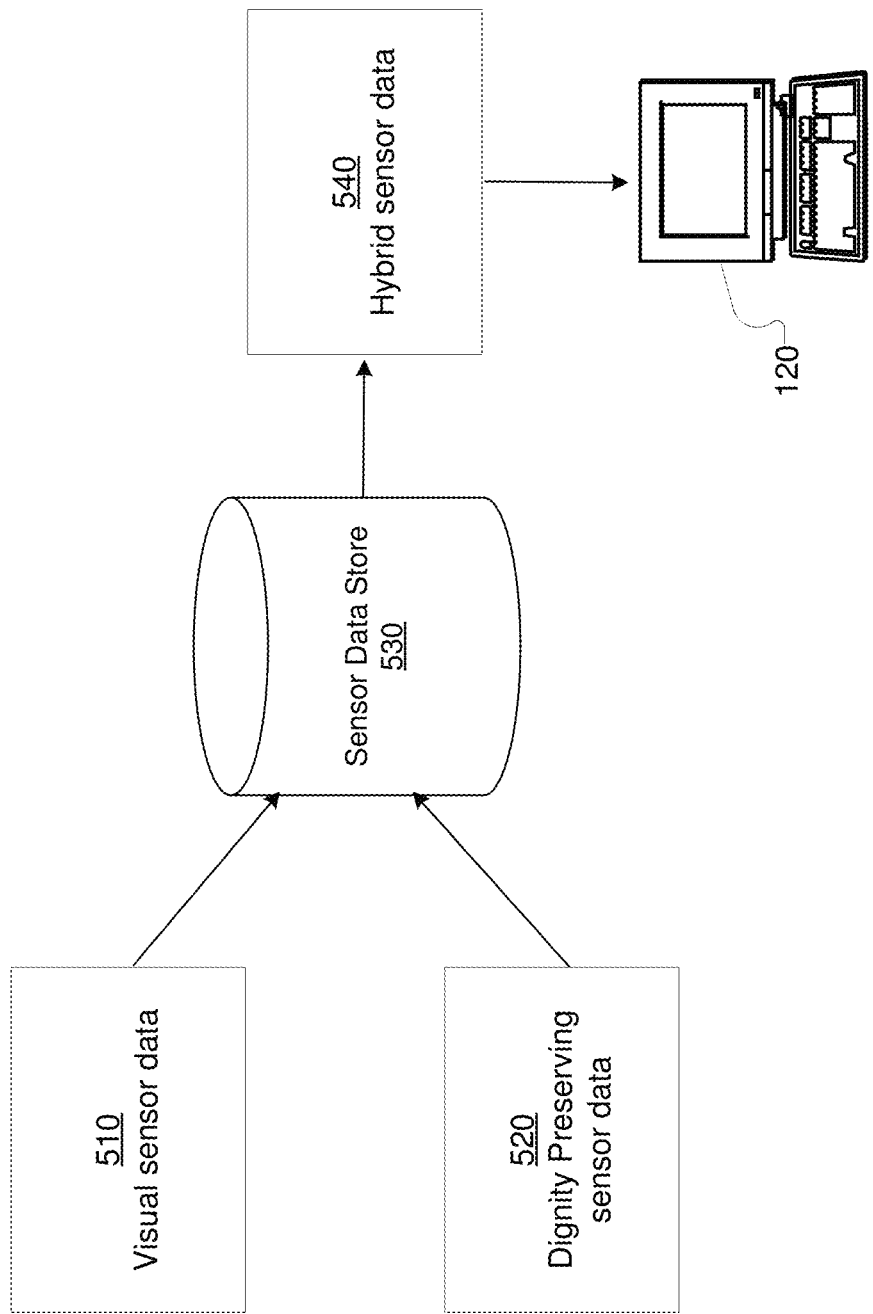
FIG. 5 illustrated use of multiple sensor data for implementing dignity preservation for persons being monitored, according to an embodiment.

FIG. 5 illustrated use of multiple sensor data for implementing dignity preservation for persons being monitored, according to an embodiment. The system receives sensor data captured by visual sensors 510 such as cameras and non-visual sensors 520 such as LIDAR and IR sensors. The system stores the sensor data on a sensor data store 530. The system combines the sensor data to generate hybrid sensor data 540 that is dignity preserving and provides it to the monitoring system 120.

Figure 6:
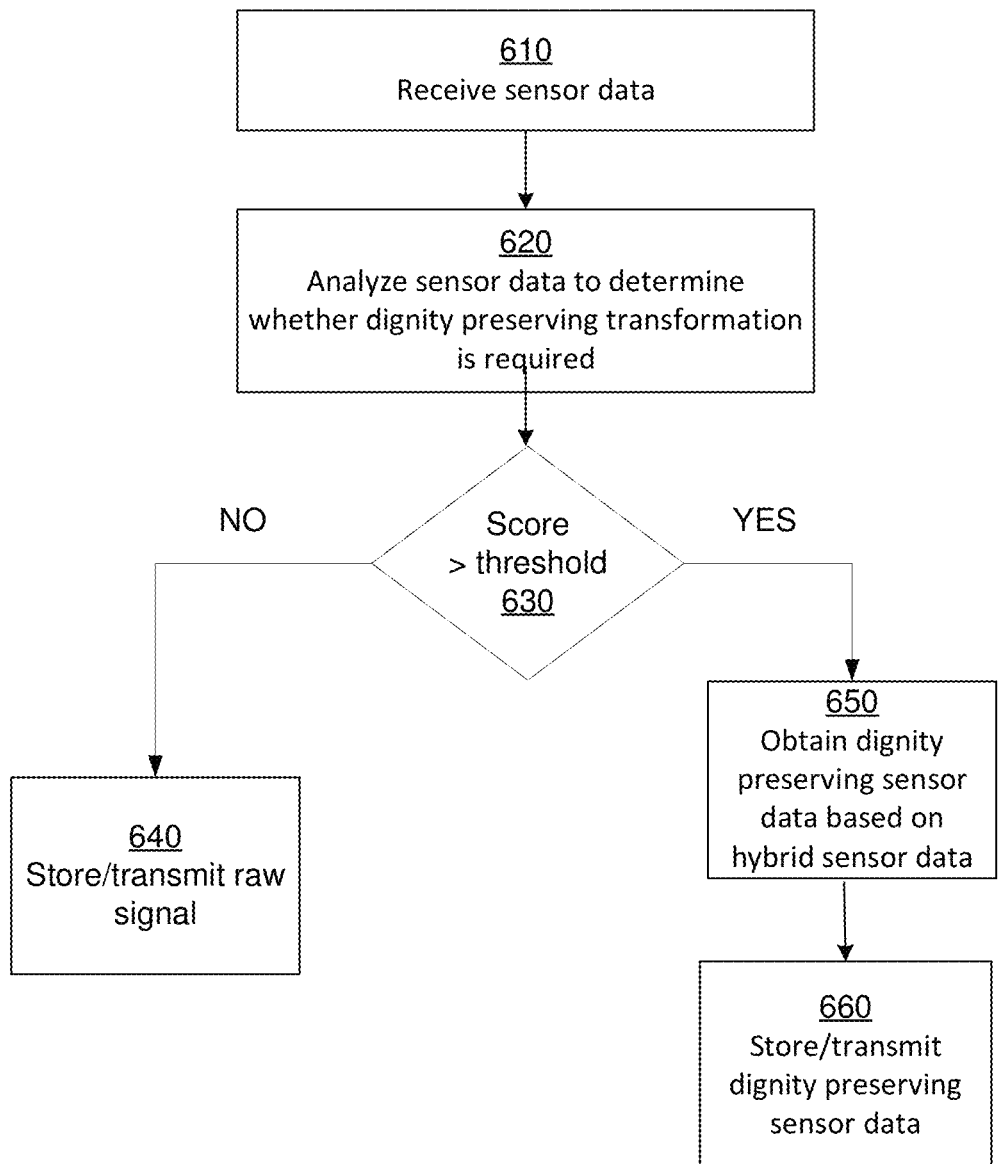
FIG. 6 is a flowchart of a process illustrating generation of dignity preserving video, in accordance with one embodiment of the invention.

FIG. 6 is a flowchart of a process illustrating generation of dignity preserving video, in accordance with one embodiment of the invention. The steps of the process may be performed in an order different from that indicated in FIG. 6. The steps may indicated as being performed by a system and may be performed by the various modules of the device 110 as shown in FIG. 2.

The system, for example, the system of device 110 receives 610 sensor data from a plurality of sensors. The system analyses 620 the sensor data to determine whether dignity preserving transformation is required. In an embodiment, the system processes visual sensor data, for example, video frames or images captured by a camera of the device 110 to determine whether dignity preserving transformations are required.

In an embodiment, the system provides the video frames or cameras to a machine learning model trained to generate a dignity preservation score representing whether the input video frame/image includes content that requires dignity preserving transformations. The machine learning model may be trained using labelled images taken from persons acting as models so that images of actual patients are not used. The images are shown to experts that label the images as needing dignity preservation or not needing dignity preservation. These images are provided as training data to the machine learning model. The trained model is deployed on devices 110 that are used at the locations 100.

The system compares 630 the dignity preservation score with a threshold value. If the system determines that the dignity preservation score is greater than a threshold, thereby indicating that dignity preservation transformations are required for the signals, the system obtains 650 dignity preserving sensor data, for example, by switching visual sensor data with non-visual sensor data or by performing other dignity preserving transformation described herein. The system further stores or transmits 650 the obtained dignity preserving sensor data. The dignity preserving transformations may be performed on the device 110, or on a different machine, for example, a server depending on the computational limitations of the hardware and software of the device 110.

In contrast, if the system determines based on the comparison 630 that the dignity preserving score is below the threshold value, the system determines that dignity preserving transformations are not required and the system stores/transmits 640 the raw signal, for example, the actual images captured by the visual sensor such as RGM images captured by a camera of the device 110.

In an embodiment, the system combines two sensor data so that only a portion of a frame displaying the person is replaced with dignity preserving sensor data. The system determines a bounding box or a bounding shape around the person. The system replaces the portion of the image within the bounding box or bounding shape with dignity preserving sensor data, for example, depth sensor data or IR sensor data. The sensor data outside the bounding box/bounding shape continues to be from a visual sensor such as camera. Accordingly, dignity preserving data (e.g., LIDAR or IR sensor data) is embedded within a visual image of the person being monitored. The visual portion of the image that is outside the bounding box provides context for the dignity preserving sensor data within the bounding box, making it easier for the agent to determine what the person in the image is doing as compared to the viewing the entire stream of the non-visual sensor data. The video frames of a video stream are updated on a frame by frame basis to perform the dignity preserving transformations. Accordingly, a video stream comprising hybrid sensor data is generated. In an embodiment, the visual sensor data is not even store din the sensor data store 530 and only hybrid sensor data generated by the dignity preserving transformations is stored. This provides assurance to the persons being monitored that their privacy is preserved and the raw video or images cannot be accessed by anyone since they are never stored.

In an embodiment, the video of a person is displayed using sensor data that does not provide a full visual representation of the person. For example, the video of the person displayed may be generated by LIDAR or by an infrared sensor. The system displays the non-visual sensor data, for example, depth sensor data or infrared sensor data for dignity preservation, so that in specific situations when the person needs privacy, for example, in shower or while using toilet, the visual representation of the person is hidden and non-visual sensor data is shown. In contrast visual sensor data, for example, camera output (such as RGB images or videos) may be displayed when privacy is less important.

Figure 7:
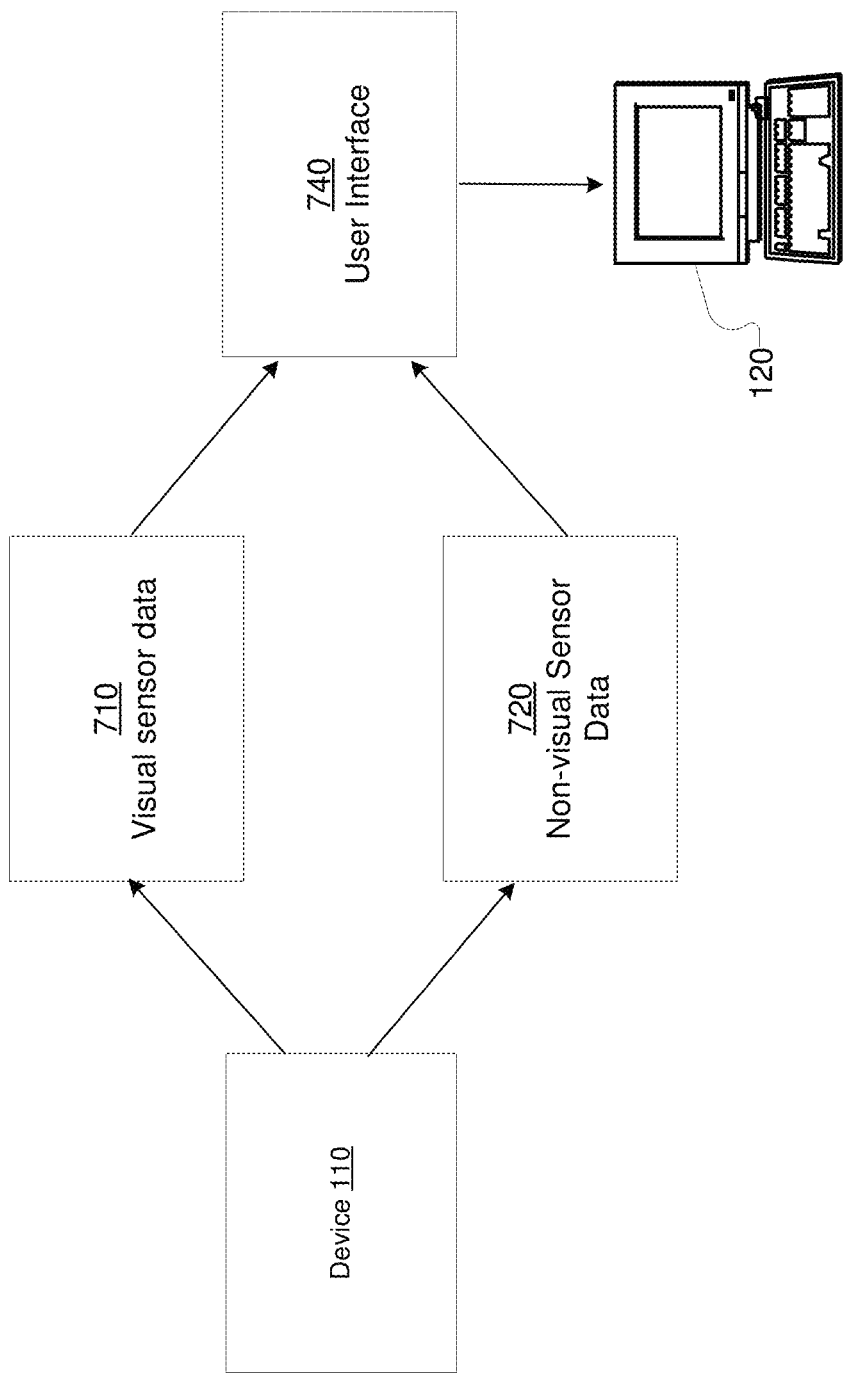
FIG. 7 illustrates details of the system providing visual sensor data that is helpful for interpreting nonvisual sensor data for an agent observing the monitoring system, according to an embodiment.

The non-visual sensor data may make it difficult for an agent viewing the display of the monitoring system 120 to determine details of the person being shown in the sensor data. FIG. 7 illustrates details of the system providing visual sensor data that is helpful for interpreting nonvisual sensor data for an agent observing the monitoring system, according to an embodiment. The system captures from the device 110, both visual sensor data 710 and non-visual sensor data 720 showing subject persons. The visual sensor data and the non-visual sensor data is captured at the same time or within a threshold time interval of each other. This sensor data may be from non-patient persons that have consented to provide such sensor data for purposes of helping the agents 125. The visual sensor data 710 and non-visual sensor data 720 may be displayed side by side, thereby allowing the agent 125 to understand the non-visual sensor data.

In these embodiments, the user interface 740 of the monitoring system allows an agent 125 to compare non-visual sensor data with visual sensor data in comparable situations. In an embodiment, the system stores example visual images of the person when the person does not need privacy. Alternatively, the system stores example visual images of non-patient persons that have consented to providing their sensor data for use by agents 125. The system extracts attributes of the visual sensor data and non-visual sensor data, for example, the distance from camera, the orientation of the person, and so on. The system stores the example sensor data in a sensor data store that indexes the example images based on one or more attributes of the image. The monitoring system determines the attributes of the person based on the non-visual sensor data and accesses the index to retrieve a matching visual sensor data that with matching attributes. This allows the agent to access images that help understand the non-visual sensor data by accessing comparable sensor data that may be from the subject person shown in the non-visual sensor data or may be from a different person in a comparable situation that is shown in the non-visual sensor data.

In an embodiment, the monitoring system uses machine learning models to determine attributes of what the person is doing based on non-visual sensor data. The monitoring system allows the agent to view the selected visual sensor data. This allows the agent to get an estimate of what the user is doing based on the non-visual sensor data since it may be difficult for an agent to look at the non-visual sensor data and determine what the person in the video is doing. The example visual images or video frames provide a base line of what the person looks like when certain non-visual sensor data is being displayed.

In some embodiments, the system performs image blurring as a dignity preserving transformation. The system uses sensor data to capture facial expressions or other physical states of the patient that is important to effective patient monitoring. So instead of face blurring, the system captures key facial features that help the agent 125 determine state of patient. So in order to do so while preserving patient privacy, the system performs transformations downstream from the information captured by the device or system that alters physical states of the patient before, during, or after transfer to some device. The system performs transformations in such a way that the perception of the original information and post-privatization information is notably different or changed in such a way of improving state or quality of patient privacy or dignity preservation. For example, the system may alter face information by adding a filter on the face portion of the image to help the system or a user detect relevant or important face features while transforming the face to look like a person different from the patient being monitored. In an embodiment, the system uses neural networks for transform the image to generate a facial image having matching facial expressions while transforming various features that are useful for recognizing the person, for example, eye color, shape or nose, shape of lips, patient hair type, arms, legs, phone on bedside, and so on. The system may perform these transformations in live-feed, or post recording.

Privatization transformations may be performed directly on the device 110, or on server-side as per computational limitations of the hardware and software. The augmentation methods may also extend to other physical features or auditory features of the patient that are personally identifiable or traceable back to the patient that is being recorded. This may also extend to other agents in the environment that have preference to have their information also undergo privatization methods.

In an embodiment, the system determines the type of transformation to be performed on a face of a person based on how clearly the facial expressions and facial features are visible in the image. For example, if the system determines that the facial features and expressions are clearly visible in the person being observed, the system applies a computationally intensive transformation Tx that preserves facial expressions while transforming certain features that make it difficult to recognize the person. If the system determines that the image of the person being recorded does not show the facial features clearly, for example, if the person is too far from the camera or the person is facing a different direction, the system applies a different dignity preserving transformation Ty that may simply anonymize the person without necessarily preserving facial expressions. In an embodiment, the system uses a machine learning based model to determine which anonymization transformation to apply (whether Tx or Ty) to the image. The machine learning model is trained by providing images at different levels of facial details and a different distance from the camera. An expert user labels the images by annotating the image with information describing whether the transformation Tx should be applied or the transformation Ty. The machine learning model is executed for a video frame to determine which dignity preserving transformation to apply and the system applies the selected dignity preserving transformation. This technique allows the system to apply less computationally intensive transformations if possible, thereby preserving energy, for example, by extending the battery life of the device 110.

In certain situations, there may be multiple persons in the image, for example, a caregiver that is helping a patient along with the patient. The system tracks the users across videoframes and identifies the users. Accordingly, when the system applies the dignity preserving transformations, the individual persons shown in the resulting image shown may not bet recognizable. Accordingly, the system annotates 860 the individuals in the image shown after dignity preserving transformation are applied so that the agent 125 can identify each individual in the image. In an embodiment, the system identifies other recognizable objects in the image, for example, bed, a chest of drawer, a window and so on and cross labels them across different sensor data so that an agent can recognize the objects when shown as dignity preserving sensor data. Each individual or an object shown in the image may be labeled with a unique identifier that is used across various video frames including the video frames to which dignity preserving transformations are applied. In an embodiment, the labels of the objects shown in the sensor data are generated by object recognition techniques so that human understandable labels are provided rather than machine generated labels that may be difficult to correlate for an agent 125. In an embodiment, the annotations of the sensor data performed by comparing visual sensor data with non-visual sensor data is used for training of the machine learning models. The annotations may also be used for training a new agent 125 that is learning to use the monitoring system 120.

Figure 8:
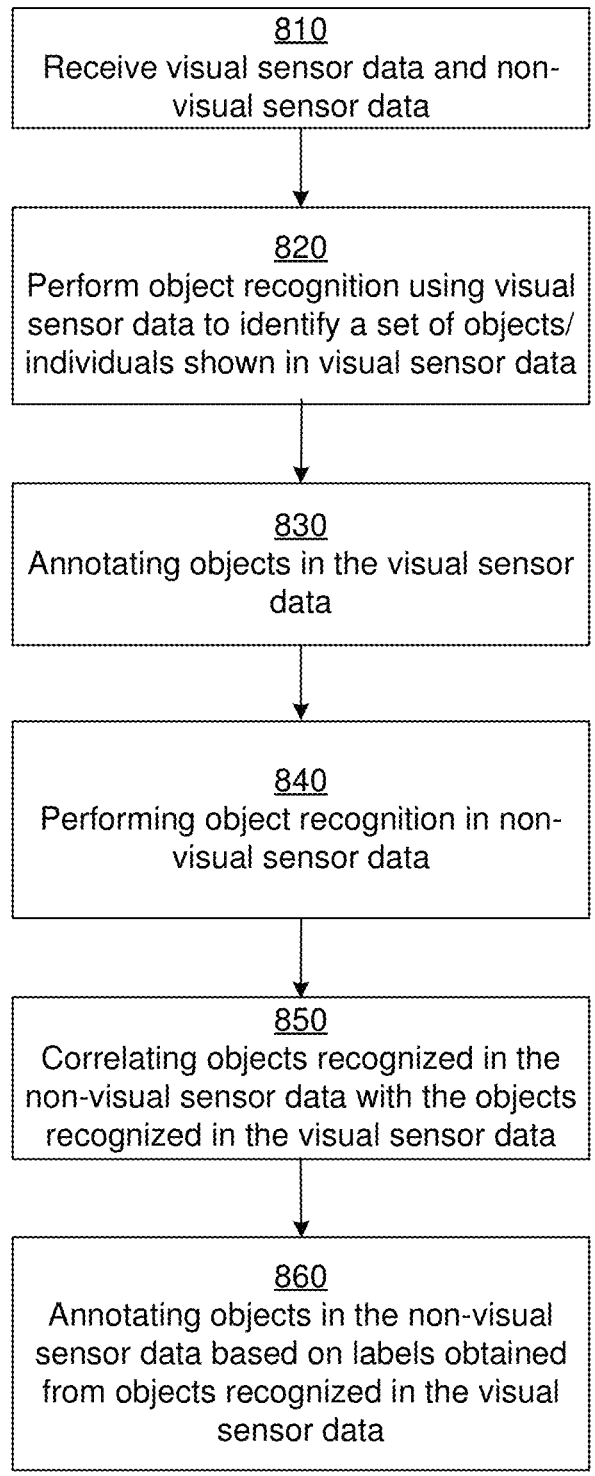
FIG. 8 illustrates annotation of non-visual sensor data based on labels generated from visual sensor data, according to an embodiment.

FIG. 8 illustrates annotation of non-visual sensor data based on labels generated from visual sensor data, according to an embodiment. The system receives 810 visual sensor data as well as non-visual sensor data capturing a subject person being monitored. The visual sensor data as well as non-visual sensor data is captured at the same time or within a threshold time of each other. The system performs 820 object recognition using the visual sensor data to identify a set of objects or individuals in the visual sensor data. The system annotates 830 objects in the visual sensor data. The system performs 840 object recognition in the non-visual sensor data. The system correlates 850 the objects recognized in the visual sensor data with the objects recognized in the non-visual sensor data. Since the visual sensor data and the non-visual sensor data is captured within a threshold time of each other, the object identified in one type of sensor data are spatially located in the same position as the other sensor data. Accordingly, the system may correlate the data based on their positions in the two types of sensor data and annotate 860 objects in the non-visual sensor data based on labels obtained from objects recognized in the visual sensor data. For example, the system may determine bounding boxes of the objects in the two types of sensor data. The system overlaps the two types of sensor data to identify bounding boxes across the two types of sensor data that have maximum overlap. If an object in the visual sensor data has more than a threshold overlap with an object in the non-visual sensor data, the system determines that the two objects are same and uses the annotation of the object from the visual sensor data to annotate the corresponding object observed in the non-visual sensor data.

In an embodiment, the monitoring system either receives the risk score or determines the risk score and determines the action to be taken based on the value of risk score. The risk score may be classified as different categories of risk level, for example, high risk, medium risk, and low risk. For example, the monitoring system is configured with various threshold values and depending on the range in which the risk score lies the system may report to a different agent depending on the risk score values. For example, if the system determines that the person being monitored is in a high risk situation and raise a high risk alert, for example, by reporting to care takers that are experts at handling emergency situations. The different types of agents may be located in different locations and may have different ways of contacting them. The system is configured to contact various agents and contacts them depending on the risk score.

In an embodiment, the system contacts the target agent repeatedly at a predetermined frequency, in case the system doesn't receive an acknowledgement indicating that the agent has received the alert and is taking appropriate action. The system may determine the rate at which the target agent is repeatedly contacted based on the risk score. For example, the system attempts to contact the agent at a higher frequency if the risk score indicates a high risk compared to the rate used when the risk factor indicates a low risk.

Use of Different Model Based on Categories of Persons being Monitored

In some embodiments, different machine learning models 230 are trained for different categories of moveable objects. For example, the conditions of the persons being monitored are categorized into specific types of health conditions and a model trained for each category of health conditions. Certain health conditions make it risky for a person to perform certain type of action whereas other health condition may make it risky to perform a different type of action. Furthermore, the type of actions that are significant for a person having a particular medical condition may be different from a person having a different medical conditions. For example, walking may be a high risk operation for a particular medical condition, whereas eating food at a particular time may be a high risk operation for a different medical condition. Accordingly, the system trains the model for predicting risk scores based on different actions for different categories of person being modeled. In some embodiments, the features provided as input to the machine learning model are also determined based on the category of the person, for example, based on their medical condition. The system may collect and record different type of data based on the category of the person.

Figure 9:
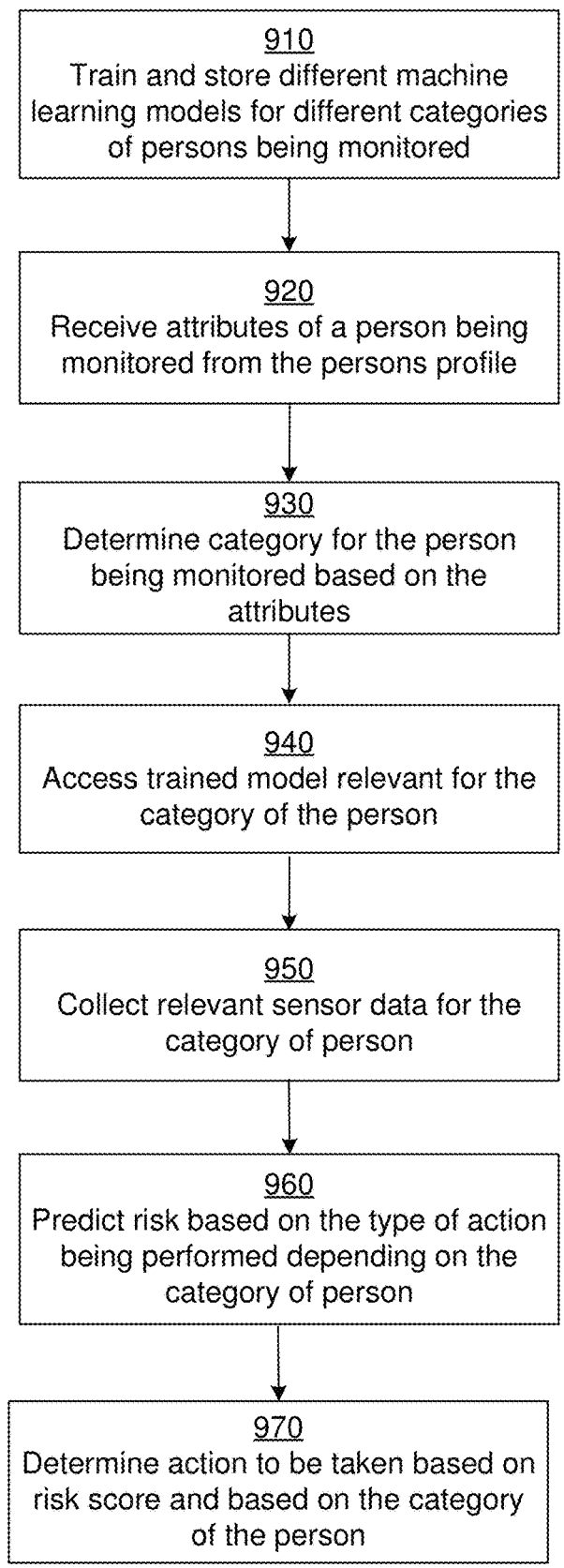
FIG. 9 illustrates a process for categorizing persons being monitored and using a different machine learning model for different categories of persons according to an embodiment.

FIG. 9 illustrates a process for categorizing persons being monitored and using a different machine learning model for different categories of persons according to an embodiment. According to an embodiment, the system categorizes the moveable objects, for example, the person being monitored into different categories. For example, the person being monitored is categories based on their health condition (i.e., medical condition). The system trains 910 and stores a different machine learning model for each category of the person. The system receives 920 attributes of the person being monitored for example, from a user profile of the data such as the health care profile of the person. The system determines 930 the category of the person being monitored based on the attributes of the person. The trained machine learning model for the category of the person is accessed 940 and deployed on the device 110 of the person. This is assuming that the device 110 is dedicated to a particular person.

The device 110 is also configured for the category of the person. For example, the system of the device 110 is configured to collect sensor data 950 relevant to the category of the person and also log only relevant information. The ability to collect and log specific information for each person makes the processing computationally efficient and also energy efficient, for example, by saving power (e.g., battery) for the device 110. The machine learning model specific to the category of the person that is deployed on the device 110 is executed to predict the risk score of the person based on the sensor data. The risk score may be predicted 960 based on the type of action being performed by the person, which in turn depends on the category of the person. Depending on the risk score, the system may determine 970 action to betaken that further depends on the category of the person. For example, an agent contacted in case of a high risk alert is selected based on the category of the person.

In an embodiment, the machine learning model determines the type of action that the person is performing. The system stores a database of type of actions and associated risks for different health conditions of patients. The system accesses the database to determine the risk based on the health condition of the person and the action that the person is performing. Accordingly, the sensor data is provided to a first model M1 that takes as input the sensor data and outputs the type of action that the person is performing. The output of the model M1 is provided as an input to a second model M2 along with other input comprising attributes describing the health condition of the person. The model M2 predicts a risk score for the action being performed based on the condition of the person. The risk score is used by the system to determine the action that should be taken by a monitoring agent in a given situation for a given person being monitored. The system may send the sensor data for the person to a monitoring system. In an embodiment, the system makes a recommendation of action to be taken by the agent in a given situation.

In an embodiment, the system includes mechanisms to alert the patient, virtual human monitor, in-person care staff, and/or other relevant agents of the patient's environment. The system may be customized to single-to-many agents or types of agents with some mechanism in which information is dealt with relevant to agent or environment or event monitoring, detection, collection, transmission and other relevant mechanisms or actions to monitor the person of interest. For example, the care staff or other relevant agents may customize what event or actions are considered low, medium, or high risk. The care staff or other relevant agents may also customize the agent that gets alerted for what (1) event or actions themselves or (2) event or actions risk level. The system may trigger an alarm that may be turned off with manual or autonomous method that may or may not be in same environment as the person being monitored, for example, via a cellular device or mobile device that may be different from the device 110.

In an embodiment, the system performs detection and collection of data for performing data analytics. The system performs key patient events, actions, or state. The collected data can be visualized by any of the care staff team members to view patterns of patient state changes, action changes, and other relevant data to help determine whether the patient state has improved, stayed the same, or worsened over a specific time period (e.g. from end of previous nurse shift to end of current nurse shift). The collected data may be used for training of various machine learning models disclosed herein.

In an embodiment, the system adjusts settings of the sensors automatically. For example, depending on the environmental conditions such as amount of light available, the system adjusts the brightness settings of cameras. The situations when it is hard to monitor the patient is (1) when lighting in environment has changed non-ideally (e.g. nighttime or low-light), or (2) patient is obscured from view (e.g. either through physical objects, patient is out of frame, or viewing distance relative to patient is not ideal). The device 110 detects and/or take in the original environment information and through some mechanism, convert it to a suitable environment relevant to monitoring of the person. In an embodiment, if the light available is below a threshold indicating that camera images are unlikely to be of any value, the system switches to sensors such as infrared sensors or LIDAR sensors that do not depend on the amount of light in the environment being monitored.

In an embodiment, if the system detects that the subject being monitored is out of range of the sensors for more than a threshold amount of time, the system sends an alert requesting the device 110 to be moved so that it can be positioned in a manner that keeps the subject person within range. The alert may be in terms of a signal being sent to the device itself or to a device of a caregiver helping the person. In an embodiment, the system automatically adjusts the viewing area of the sensors as the subject being monitored moves.

The location being monitored may include more than one person or moveable objects that are monitored by the device 110. Multiple devices may be installed in a location and work with each other or independently. Second, the patient may be in any (x,y,z) coordinate relative environment being monitored and device being used to monitor patient. Third, the patient(s) being monitored and the device itself does not have to be a dedicated patient room (e.g. hallway), and the patient and monitoring device do not need to be in the same space (e.g. device can be monitoring from hallway, viewing into patient room).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving sensor data captured by a plurality of sensors placed in a location, wherein the plurality of sensors capture sensor data comprising a person being monitored and environment surrounding the person, the plurality of sensors comprising at least a camera and a second sensor, wherein the plurality of sensors comprise a non-visual sensor capturing non-visual sensor data and a visual sensor capturing visual sensor data;
   performing object recognition in the visual sensor data to identify a first set of objects visible in the visual sensor data;
   labeling each of the first set of objects identified in the visual sensor data;
   performing object recognition in the non-visual sensor data to identify a second set of objects in the non-visual sensor data;
   correlating objects from the second set of objects identified in the non-visual sensor data with the first set of objects annotated using the visual sensor data, the correlating based on location of each object in corresponding sensor data;
   labeling objects from the second set of objects identified in the non-visual sensor data based on labels of corresponding objects identified in the visual sensor data;
   performing a dignity preserving transformation of the visual sensor data, wherein the dignity preserving transformation replaces at least a portion of the visual sensor data with non-visual sensor data along with labels of identified objects in the non-visual sensor data; and
   transmitting the visual sensor data transformed by applying the dignity preserving transformation to a remote monitoring system, for display via a user interface.

2. The computer-implemented method of claim 1, wherein correlating objects from the second set of objects identified in the non-visual sensor data with the first set of objects annotated using the visual sensor data comprises:
   determining bounding boxes of the objects in the visual sensor data and non-visual sensor data;
   overlapping the visual sensor data and the non-visual sensor data identify bounding boxes across the visual sensor data and non-visual sensor data that have maximum overlap; and
   responsive to determining that an bounding box corresponding to a first object in the visual sensor data has more than a threshold overlap with a bounding box corresponding to a second object in the non-visual sensor data, correlating the first object with the second object.

3. The computer-implemented method of claim 1, wherein each of the first set of objects identified in the visual sensor data is labelled using a unique identifier.

4. The computer-implemented method of claim 1, wherein labels of objects are generated by performing object recognition.

5. The computer-implemented method of claim 1, wherein the visual sensor data and non-visual sensor data is captured within a threshold time of each other.

6. The computer-implemented method of claim 1, wherein the non-visual sensor is one of an infrared sensor or a LIDAR.

7. The computer-implemented method of claim 1, wherein the visual sensor is a camera.

8. A non-transitory computer readable storage medium storing instructions that when executed by one or more computer processors cause the one or more computer processors to perform steps comprising:
   receiving sensor data captured by a plurality of sensors placed in a location, wherein the plurality of sensors capture sensor data comprising a person being monitored and environment surrounding the person, the plurality of sensors comprising at least a camera and a second sensor, wherein the plurality of sensors comprise a non-visual sensor capturing non-visual sensor data and a visual sensor capturing visual sensor data;
   performing object recognition in the visual sensor data to identify a first set of objects visible in the visual sensor data;
   labeling each of the first set of objects identified in the visual sensor data;
   performing object recognition in the non-visual sensor data to identify a second set of objects in the non-visual sensor data;
   correlating objects from the second set of objects identified in the non-visual sensor data with the first set of objects annotated using the visual sensor data, the correlating based on location of each object in corresponding sensor data;
   labeling objects from the second set of objects identified in the non-visual sensor data based on labels of corresponding objects identified in the visual sensor data;
   performing a dignity preserving transformation of the visual sensor data, wherein the dignity preserving transformation replaces at least a portion of the visual sensor data with non-visual sensor data along with labels of identified objects in the non-visual sensor data; and transmitting the visual sensor data transformed by applying the dignity preserving transformation to a remote monitoring system, for display via a user interface.

9. The non-transitory computer readable storage medium of claim 8, wherein correlating objects from the second set of objects identified in the non-visual sensor data with the first set of objects annotated using the visual sensor data comprises:

determining bounding boxes of the objects in the visual sensor data and non-visual sensor data;

overlapping the visual sensor data and the non-visual sensor data identify bounding boxes across the visual sensor data and non-visual sensor data that have maximum overlap; and responsive to determining that an bounding box corresponding to a first object in the visual sensor data has more than a threshold overlap with a bounding box corresponding to a second object in the non-visual sensor data, correlating the first object with the second object.

10. The non-transitory computer readable storage medium of claim 8, wherein each of the first set of objects identified in the visual sensor data is labelled using a unique identifier.

11. The non-transitory computer readable storage medium of claim 8, wherein labels of objects are generated by performing object recognition.

12. The non-transitory computer readable storage medium of claim 8, wherein the visual sensor data and non-visual sensor data is captured within a threshold time of each other.

13. The non-transitory computer readable storage medium of claim 8, wherein the non-visual sensor is one of an infrared sensor or a LIDAR.

14. The non-transitory computer readable storage medium of claim 8, wherein the visual sensor is a camera.

15. A computer system comprising:

one or more computer processors; and a non-transitory computer readable storage medium storing instructions that when executed by the one or more computer processors cause the one or more computer processors to perform steps comprising:

receiving sensor data captured by a plurality of sensors placed in a location, wherein the plurality of sensors capture sensor data comprising a person being monitored and environment surrounding the person, the plurality of sensors comprising at least a camera and a second sensor, wherein the plurality of sensors comprise a non-visual sensor capturing non-visual sensor data and a visual sensor capturing visual sensor data;

performing object recognition in the visual sensor data to identify a first set of objects visible in the visual sensor data;

labeling each of the first set of objects identified in the visual sensor data;

performing object recognition in the non-visual sensor data to identify a second set of objects in the non-visual sensor data;

correlating objects from the second set of objects identified in the non-visual sensor data with the first set of objects annotated using the visual sensor data, the correlating based on location of each object in corresponding sensor data;

labeling objects from the second set of objects identified in the non-visual sensor data based on labels of corresponding objects identified in the visual sensor data;

performing a dignity preserving transformation of the visual sensor data, wherein the dignity preserving transformation replaces at least a portion of the visual sensor data with non-visual sensor data along with labels of identified objects in the non-visual sensor data; and transmitting the visual sensor data transformed by applying the dignity preserving transformation to a remote monitoring system, for display via a user interface.

16. The computer system of claim 15, wherein correlating objects from the second set of objects identified in the non-visual sensor data with the first set of objects annotated using the visual sensor data comprises:

determining bounding boxes of the objects in the visual sensor data and non-visual sensor data;

overlapping the visual sensor data and the non-visual sensor data identify bounding boxes across the visual sensor data and non-visual sensor data that have maximum overlap; and responsive to determining that an bounding box corresponding to a first object in the visual sensor data has more than a threshold overlap with a bounding box corresponding to a second object in the non-visual sensor data, correlating the first object with the second object.

17. The computer system of claim 15, wherein each of the first set of objects identified in the visual sensor data is labelled using a unique identifier.

18. The computer system of claim 15, wherein labels of objects are generated by performing object recognition.

19. The computer system of claim 15, wherein the visual sensor data and non-visual sensor data is captured within a threshold time of each other.

20. The computer system of claim 15, wherein the non-visual sensor is one of an infrared sensor or a LIDAR.

* * * * *